Nov. 21, 1950 R. VILLEM 2,530,926

SHORT-WAVE, LONG DISTANCE COMMUNICATION SYSTEM

Filed June 17, 1947 3 Sheets-Sheet 1

INVENTOR:
RAYMOND VILLEM
By John B. Brady
Attorney.

SHORT-WAVE, LONG DISTANCE COMMUNICATION SYSTEM

Filed June 17, 1947 3 Sheets-Sheet 2

INVENTOR:
RAYMOND VILLEM
By John B. Brady
Attorney

INVENTOR
RAYMOND VILLEM
By John B. Brady
Attorney

Patented Nov. 21, 1950 2,530,926

UNITED STATES PATENT OFFICE 2,530,926

SHORT-WAVE, LONG DISTANCE COMMUNICATION SYSTEM

Raymond Villem, Paris, France, assignor to Societe Francaise Radio-Electrique, a corporation of France Application June 17, 1947, Serial No. 755,037
In France April 22, 1944

Section 1, Public Law 690, August 8, 1946
Patent expires April 22, 1964

1 Claim. (Cl. 250—6)

My invention relates to improvements in systems for long distance communications.

It is well known that long distance short wave communications are subject to distortions due to the propagation and that the said distortions result in a selective fading in the reception of the frequencies belonging to the transmitted spectrum. In telephone transmissions in particular, that fading, which depends on the time and the frequencies, results in a diminution of the intelligibility of the conversations.

Various systems have been proposed in order to reduce the effects of that selective fading. Among them the following may be mentioned:

1. The systems of one side-band transmission in which the selective fading of the carrying wave is avoided and the carrier wave restituted at the receiving side with a fixed amplitude; but such systems have no effect on the fading of the frequencies comprised in the side band.

2. The multiple receptions based on the probability of the effects, either in the space, or in the time; the multiple reception mostly used consists in providing several receiving sets each one of which is connected to an aerial, an associated device automatically selecting the receiving set which delivers the strongest carrier wave. From the point of view of the invention, the multiple reception system just defined enters in action efficaciously if and when only the fading attains the carrier wave and a great part of the spectrum received on one of the receivers.

3. The reception by means of multiple directive orientable aerials in the vertical plane according to which a selection is made, on the receiving side, among the various wave beams reaching the receiver. The reception thus employs an aerial of very high directivity, of such an action that the collected waves may be comprised in a very sharp (or tapered) solid angle. In those conditions the collected waves contained in the said angle cover respective distances which are not very different and consequently offer only small phase differences with reference to each other.

The experience, however, has shown that in the short wave long distance communications, it is not possible to maintain the time difference permanently reduced to a value less than 200 microseconds, which for a frequency of 5000 cycles per second represents one period. Thus is easily realized that when a phase or time difference exists between two trajectories of waves having the same amplitude modulated at a frequency of 2500 cycles per second, corresponding components will, after the detection, be found in phase opposition, the corresponding modulation being consequently annulled.

For the frequencies of modulation smaller than 2500, the fading effects will be the more reduced when the frequencies are the lower. My invention has for object, in agreement with the above mentioned experimental results, to reduce to a very low value the effects of the selective fading by adopting special dispositions regarding the modulations and appropriate combinations at the receiving side. I refer namely to the following:

*a.* The use of wide band radiodiffusion;

*b.* The realization of commercial radiotelephony of high intelligibility;

*c.* The realization of multiplex telephone and telegraph systems;

*d.* The obtaining of a high degree of secrecy in the telephone conversations.

The principle of my invention consists, being given a frequency spectrum necessary for realizing the desired communication, in utilizing, separately or in combination, the various following procedures:

1. Divide up, by means of appropriate filters, the frequency spectrum to be transmitted, into a certain number of partial bands the width of which is determined by the maximum fluctuation of the selective fading which should be admissible, in taking account of the conditions of installation of the reception aerials;

2. Proceed on the various partial bands to appropriate transpositions and associate them by pairs, on both sides and very close, of a pilot frequency obtained from a local generator; then modulate the transmitter by the known process of the one-band transmission;

3. On the receiving side, synchronize a demodulation oscillator by means of the pilot wave of each couple of bands, the said pilot band being separated beforehand; then demodulate in separate circuits the partial bands of each couple, in doing so that they interfere with the corresponding synchronized oscillator.

For a better understanding of the invention, I will apply the above procedures to the particular following case, which corresponds to a high quality of radio diffusion and is cited as an instance, for explanatory reason but not limitatively.

My invention will be more clearly understood from the specification hereinafter following by reference to the accompanying drawings, in which.

Figure 1:
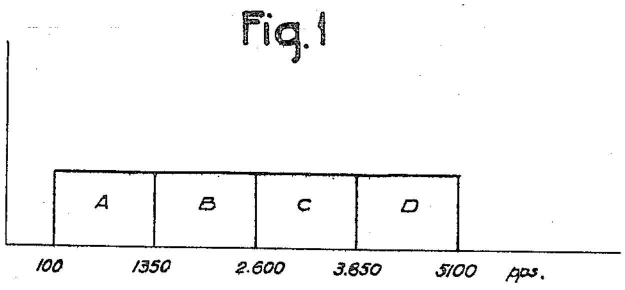
Figure 1 is a graph showing an example of a low frequency spectrum to be transmitted.

Fig. 1 shows the low frequency spectrum (from 100 to 5100 cycles per second) which must be transmitted. That spectrum is divided up, by means of filters, into partial bands A, B, C and D, the width of which equals 1250 periods per second; indeed it is well known that, by means of modern filters, the said operation may be effected with the mere suppression in the spectrum of a trifling frequency range, which remains unnoticeable for the ear.

Figure 2:
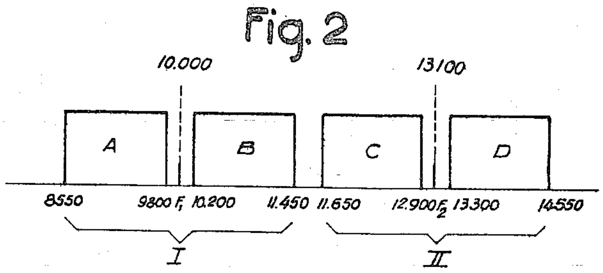
Fig. 2 shows, according to the invention, the modification of the spectrum of Fig. 1 after transposition of the partial bands and addition of two pilot frequencies.

Fig. 2 shows, for instance, what becomes of the initial spectrum after transposition of the partial bands and adjunction of a pilot intermediate frequency F1 to the bands A, B and of an intermediate pilot frequency F2 to the bands C, D; thus are obtained two elementary groups I and II corresponding respectively to the pilot frequencies F1 and F2, the values of which are merely given for indicative purpose.

Figure 3:
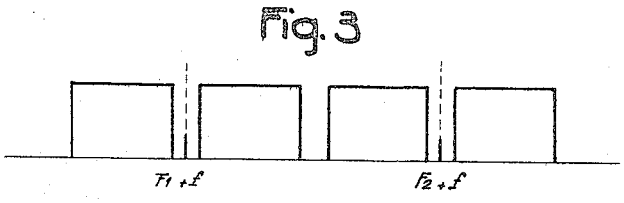
Fig. 3 shows the radiated spectrum of Fig. 2, after addition of the frequency of the carrier wave.

The modulation of the transmitter is then assured by means of the known process for obtaining the one-band transmission, with particular reference to the spectrum totalizing the elementary groups, it must be transposed to a degree sufficient for obtaining that, when applied to the modulation of the transmitter, the terminal high frequency circuits of the said transmitter isolate in the aerial one only of the side bands and suppress the carrier wave of the transmitter and the second side band Fig. 3 shows the radiated spectrum, which is similar to the one of Fig. 2, with the difference that all the frequencies have been increased by the addition of the carrier wave frequency $f$ of the transmitter.

On the receiving side, for obtaining the full effect of the foregoing procedures, advantage is drawn from the adoption of an aerial combination similar to the one used in receiving stations including aerials characterized by a very sharp or tapered diagram with orientation in the vertical plane. That aerial combination works with a receiving combination which is, according to the invention, after appropriate frequency changes, adapted so as to separately treat each one of the elementary groups the pilot wave of which, after having been isolated, is utilized for synchronizing a demodulation oscillator. In each one of the elementary groups are equally treated the two partial bands separately.

The demodulation is effected by bringing to interference, in separate circuits, the partial bands of each one of the groups with the corresponding synchronized oscillator. The low frequency bands thus obtained are afterwards restituted with their initial spectrum by means of appropriate transpositions and they are combined in their respective utilization circuits.

The above evidences immediately that, the final demodulations being made by interference of each oscillator with a partial band differing in frequency from the synchronized oscillator by a maximum of 1450 cycles per second, we are placed, from the point of view of the selective fading, in the same conditions as if the transmitted band were of only 1450 cycles per second.

In those conditions, for a difference of 200 microseconds between the waves incoming through various trajectories, the phase difference between the low frequency corresponding components, which would be of 180° for the frequency 2500, drops to $$180\times\frac{1450}{2500}=104°$$

approximately.

The maximum variation of amplitude of the frequency of the received spectrum which is the most unfavorably received is thus reduced in the ratio of 1 to 0.62, i. e. 38%, which corresponds to 4 decibels, instead of being exposed to a variation of 1 to zero (reckoning from the frequencies superior to 2500 cycles per second) in the case of non-application of the foregoing procedures shown in the above discussion. Moreover it should be observed that in that latter case the amplitude variations of the frequencies included in the band from 1250, to 2500 can respectively reach 38% for the frequency 1250 and regularly increase with the frequency so as to finally produce the total annulation when the frequency reaches 2500.

In the instance under discussion, the division of the initial spectrum into partial bands covering 1250 periods per second, the frequency of which most remote from the pilot band being 1450 periods per second, is a prearranged condition which could be considerably altered, and it is obvious that the division may be made into bands more or less important according to the residual irregularities which it is considered best to admit.

It is namely possible to compensate differences larger than the ones above considered, such as are obtained, for instance, by the use of simpler aerials, or else in the case of normal directive antennae, with a division into narrower bands. It should be observed, however, that in the case of a width of band of given value to transmit, the simplification of the aerial will result in a greater number of elementary groups, a condition which leads to necessity of increasing the importance of the receiver.

For more precision I will describe, as an instance given non-limitatively, a transmitter-receiver combination using the devices of the invention, aiming at securing a telephone commercial communication. If the spectrum which is to be transmitted ranges from 250 to 2750 periods per second, it will suffice to divide it into two bands ranging on 1250 periods per second the frequencies of which the closest on the pilot wave will be remote of 250 periods per second. The difference between the pilot frequency and the remotest frequency in each band is then equal to 1500 periods per second. For a phase difference of 200 microseconds the effects of the selective fading will be, under those conditions, limited to 4.4 decibels for the most ill-treated frequency.

Figure 4:
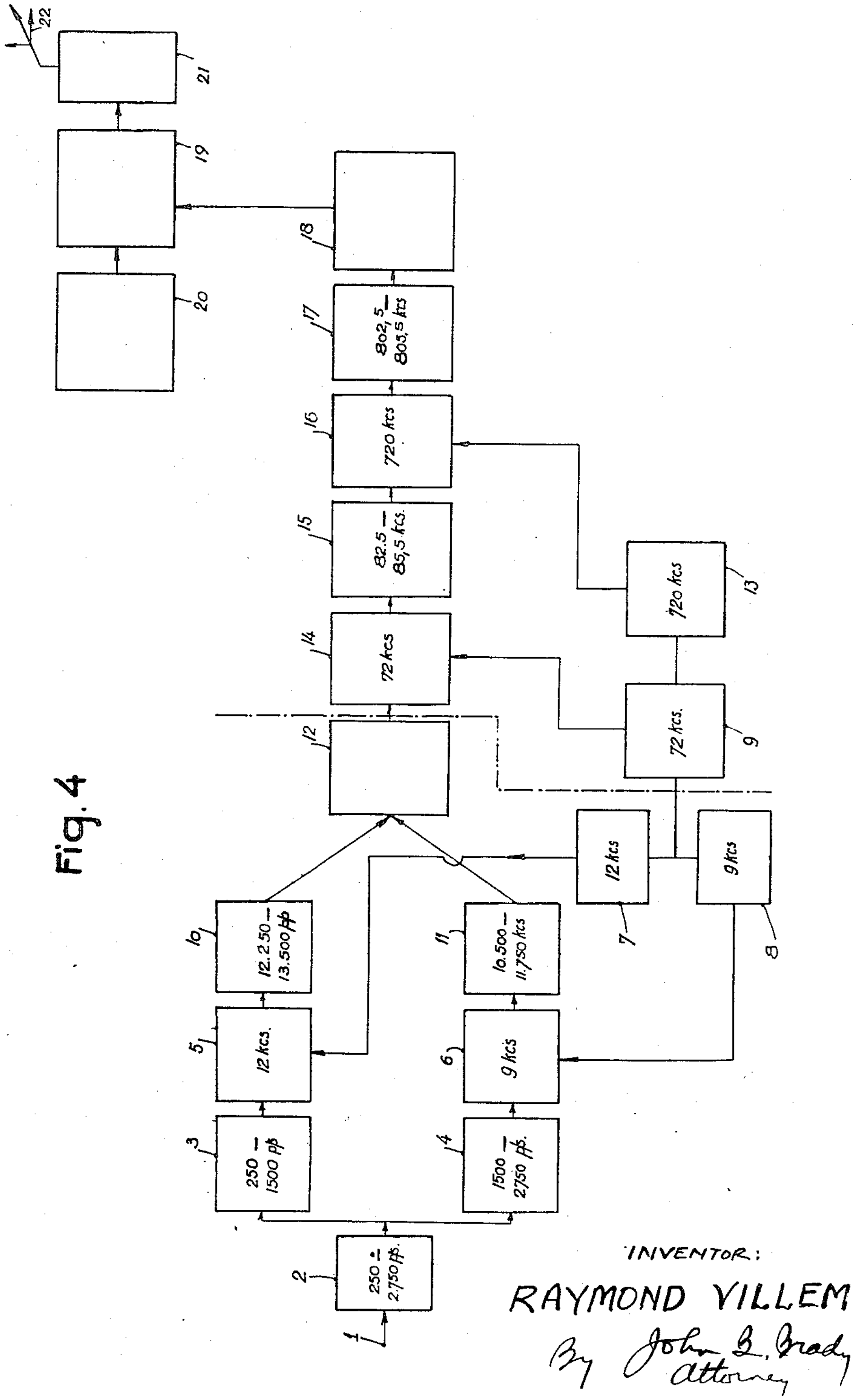
Fig. 4 is a diagram which represents the transmitting device according to the invention.
Figure 5:
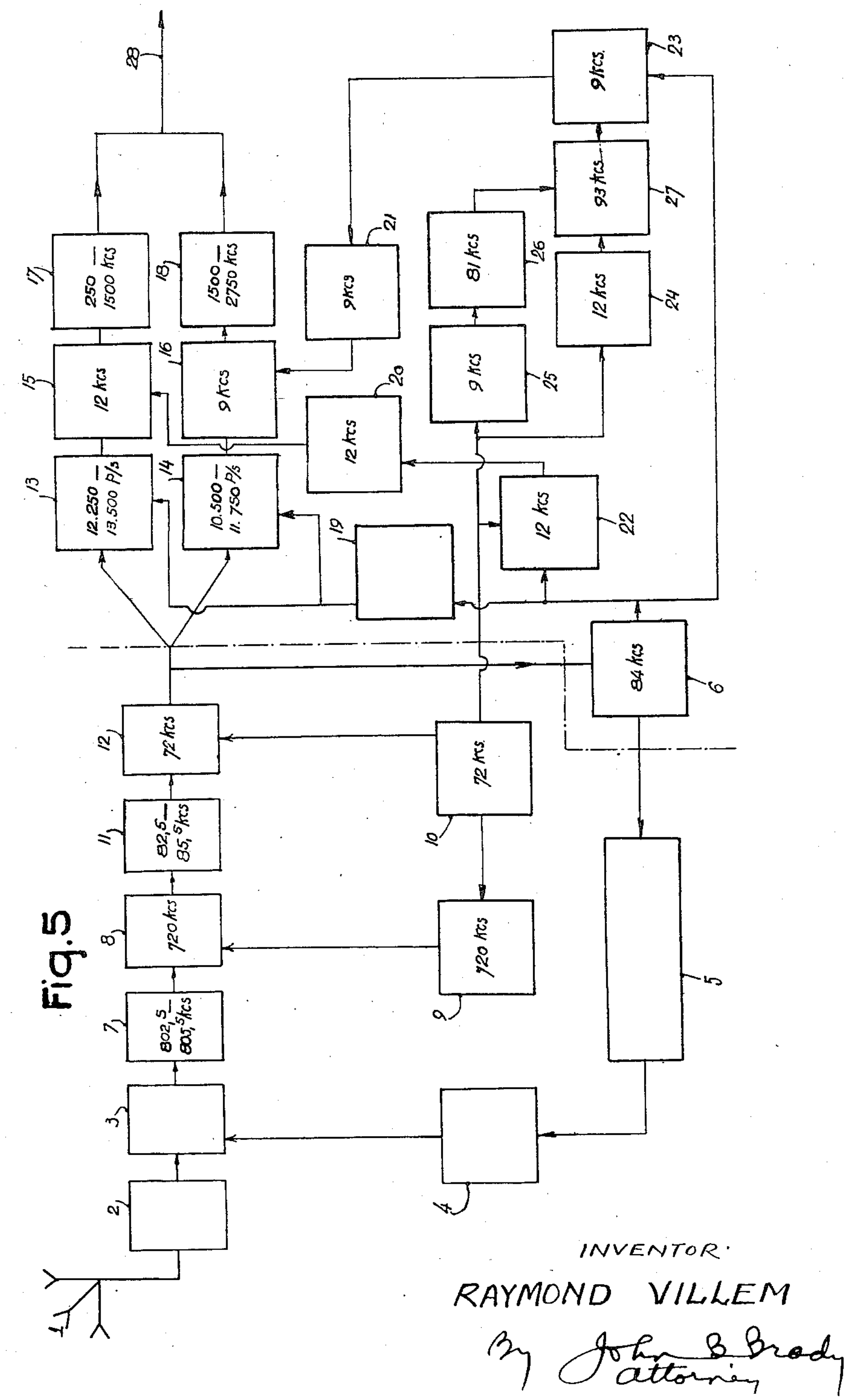
Fig. 5 is a diagram which represents the receiving device according to the invention.

Figs. 4 and 5 show respectively the combination realized on the transmission and on the reception side.

On the transmission side (Fig. 4), the voice spectrum transmitted by the telephone line 1 is, after passage through the line amplifier 2 (250 to 2750 periods per second), divided up into two partial bands by the filters 3 and 4; then the two bands themselves are transposed in the spectra 12,250 to 13,500 periods per second, and 10,500 to 11,750 periods per second, by means of two modulators 5 and 6 receiving themselves the currents of frequencies 12 and 9 kilocycles issuing from a quartz oscillator 9 of frequency 72 kilocycles through the intermediary of the demultipliers 7 and 8. The pilot wave is then, with a low amplitude compared with the one of the partial bands, introduced with the latter, into a mixer 12 which receives the partial bands once transposed through the intermediary of the two filters 10 and 11.

After the mixer 12, on the right of the dash and dots line, are to be found the procedures appropriate for a one-band transmitter where two successive transpositions of the spectrum are then effected by means of the oscillator 9 at 72 kc. and of the multiplier 13 of 720 kc. The numbers 14, 15, 16, 17, 18 respectively represent: a modulator of 72 kc.; a filter of 82.5 to 85.5 kc.; another modulator of 720 kc.; another filter of 802.5 to 805.5 kc.; and finally the modulation amplifier of the transmitter.

After the modulation of the transmitter 19, which receives from the oscillator 20 the frequency F, by the spectrum thus transposed, and after suppression by filtering, in filter 21, of the carrier wave and of one of the side-bands, the outcome results, finally, in a spectrum, radiated by the aerial 22, which comprises the following:

band F+802.5 to 803.75 kilocycles;
pilot wave F+804 kc.
band F+804.25 to 805.5 kc.

On the receiving end (Fig. 5), on the left side at first the normal components of a one band receiver in which the collected spectrum undergoes three demodulations in succession, the first effected by a high frequency heterodyne controlled by the pilot wave isolated by means of a filter, the two others obtained from a quartz at 72 kc. The various elements met with on the left side of the division line (in dots and dashes) are therefore, besides the aerial 1 and the high frequency amplifier 2: the high frequency demodulator 3 controlled by the high frequency heterodyne 4, controlled itself through the intermediary of the regulating means 5, by the pilot wave isolated by the filter at 84.6 kc.; then a filter 7 of 802.5 to 805.5 kc., a demodulator 8 at 720 kc. receiving the oscillations of the quartz 10 (of 72 kc.) through the multiplier 9 of 720 kc.; and finally another filter 11, of 82.5 to 85.5 kc. and another demodulator 12 at 72 kc. directly controlled by the quartz oscillator 10.

On the right side of the division line (Fig. 5) are shown the devices used according to the invention. It is essential that the final demodulation of the partial bands (from 12,250 to 13,500 periods per second) and (from 10,500 to 11,750 periods per second) be made in separate demodulators in order to avoid, in the utilization circuit, the production of undesirable frequencies by interference between their components. Thus the various elements met with on the right of the division line of Fig. 5 are the following:

13 and 14, Filters and amplifiers for bands of frequencies 12,250 to 13,500 periods per second and 10,500 to 11,750 respectively;
15 and 16, Final demodulators at 12 and 9 kc. respectively;
17 and 18, Filters from 250 to 1500 periods per second and 1500 to 2750 periods per second;
19, Amplifier-detector for regulation;
20 and 21, Synchronized oscillators respectively 12 and 9 kc. applied to corresponding demodulators 15 and 16;
22 and 23, Demodulators-filters 12 and 9 kc. respectively applied to the corresponding synchronized oscillators 20 and 21;
24 and 25, Demultipliers at 12 and 9 kc. respectively;
26, Multiplier at 81 kc.
27, Modulator-filter at 93 kc.;
28, Junction line to the utilization circuit.

The working of the above combination is as follows:

For the band 12,250–13,500 the final demodulation is obtained by means of the oscillator 20 (synchronized 12 kc.), and currents of frequency 12 kc. issuing from the interference between the pilot wave reduced to frequency 84 kc. in the filter 6 and the quartz 10 of 72 kc. For the band 10,500–11,750, the oscillator 21 of 9 kc. is synchronized by currents at 9 kc. issuing from the interference between the pilot wave at 84 kc. and the frequency 93 kc. obtained from the quartz at 72 kc. For producing the former frequency (of 93 kc.), use is made of the demultiplier 25 (of 9 kc.), of the multiplier 26 (of 81 kc.) and of the demultiplier 24 (of 12 kc.). The interference between 81 kc. and 12 kc. currents gives currents of 93 kc., which, combined in the demodulator 23 with the 80 kc. of the pilot wave, gives birth, after filtering, to the 9 kc. synchronizing current. The demodulated spectra are then restituted in their initial frequencies by the filters 17 and 18 and finally applied to the utilization line 28.

It should be observed that, by reason of the synchronizing of the oscillators for demodulation by the currents of which the pilot wave of frequency 84 kc. is one of the components, the restituted spectrum always comprises the exact initial frequencies. For reasons, however, regarding the filtering of the carrier wave in particular, the possible drifts are reduced by the making of all transpositions, at the transmission as well as at the reception, with the help of a crystal oscillator. Moreover, on the receiving side, there is an advantage to secure in maintaining the control of the high frequency heterodyne by means of the pilot wave according to known processes. Besides, independently of the usual common level regulator (not shown in the figure), and acting on the classical parts of the receiver treating the total spectrum collected, the system shown is completed by a level regulator for each one of the pairs of partial side bands belonging to one same elementary group, the said regulator being controlled by the pilot wave of the group. That regulator comprises an amplifier-detector placed after the filter isolating the pilot wave and acting on the grid circuit of the tubes in the amplifiers which follow the filters (12,250–13,500) periods per second and (10,500–11,750) periods per second.

More generally, my invention makes quite possible the multiplex telephone transmissions the radio-electric spectrum of which covers a large band, in permitting to limit at a very small value the amplitude variations of the various frequencies that it contains. The bands of each conversation are divided up, into two parts for each one of them, and to each part is associated an intermediary pilot wave. The elementary groups are then transposed in successive neighboring spectra and thus are again found the conditions of the Fig. 2. But from a material point of view the device must then comprise:

On the transmitting side, as many parts situated on the left side of the partition line Fig. 4 as there are of channels to transmit, and then the right section of the Fig. 4 is common to these channels. Between those two parts a supplementary mixer will have to receive all the elementary groups and to lead to the 72 kc. modulator.

On the receiver side, a common part similar to the one on the left side of the division line Fig. 5, and as many parts similar to those on the right side that there are of separate conversations. The control of the heterodyne of high frequency will be obtained in starting from any pilot wave. Moreover it should be observed that, if at the transmission all transpositions have been effected from one crystal only, it will be possible, on the receiving side, to use an identical crystal and to reproduce therewith, by interference of multiple or submultiples of the frequency of that latter with one of the pilot waves, the frequencies synchronizing the various oscillators of final demodulation.

Given the very large attenuation of the selective fading, my invention makes equally possible, on short waves, the use of systems for telephonic secrecy offering a very high degree of efficiency, which systems could only, till now, be used on long waves or cables. Those systems, in agreement with my invention, are based on the division of the voice spectrum into 4 bands, which are interchanged between themselves and inverted in their spectrum in an arbitrary way, but synchronously on the transmitting and receiving sides. The partial bands are afterwards grouped on both sides of the pilot wave.

Figure 6:
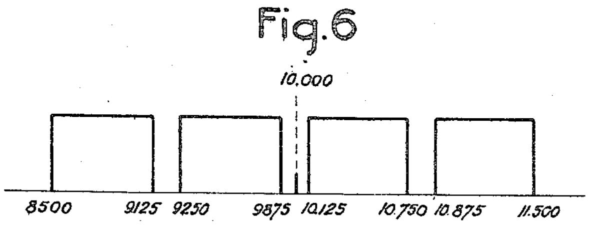
Fig. 6 is a graph explaining, by way of example, the transmission of the spectrum of the word by a device according to the invention.

For instance, supposing the voice spectrum limited to 250 to 2750 periods per second, the division and transposition gives the frequency bands shown in Fig. 6. It can be seen that, the extreme frequencies being distant from the pilot wave of only 1500 periods per second, the selective fading will be limited to 4.4 decibels for the most unfavoured frequency. That variation is low enough for rendering the commutations quite negligible.

At the reception, it will be still essential to separately proceed to the final demodulation of each one of the partial bands in separate circuits in order to avoid the production of undesirable frequencies. The partial bands reproduced in their primitive spectrum will afterwards be mixed in the utilization circuit.

In the case of multiple secret transmissions, the elementary groups of Fig. 6 will be transposed so as to be placed in different, but neighboring spectra. Moreover, following the important reduction of the selective fading, it will be possible to commute synchronously, on both the transmitting and the receiving sides any partial band with any one of the others. Thus will be greatly increased the degree of secrecy, by reason of the great number of combinations possible.

The means according to my invention will also be useful in the case of multiplex radiotelegraphic transmissions obtained by modulating the transmitter by different frequencies corresponding each to a channel. Each one of the radiotelegraphic channels being characterized by one frequency only, it is easy to understand how important may be the use of my invention for avoiding the selective fading in that specific case.

At last, in applying one or several of the procedures above discussed to communications involving combinations of receivers associated in a multiple reception and connected to aerials including multiple elements and an orientable directivity, possible applications can be realized which all remain within the scope of my invention.

What I claim is:

A system of long distance communication on short waves comprising a source of signal wave containing frequencies distributed in a low-frequency spectrum to be transmitted, an amplifier connected with the said source for amplifying the said wave, two filters connected in parallel at the said amplifier and dimensioned for selecting two contiguous bands from the initial spectrum, two frequency changers respectively connected on the one hand with the said filters and on the other hand with a stabilized heterodyne, the two said heterodynes producing frequencies differing from each other and higher than the highest frequency of the initial modulation spectrum and their difference being such that after the two frequency changes the two transposed elementary bands are close to each other, two band-passing filters connected respectively on the one hand with the said frequency changers and on the other hand with a mixer, a pilot frequency generator connected with the said mixer, a single-band transmitter modulated by the outgoing end of the said mixer, a single-band receiver having a first frequency changer connected with a heterodyne subjected to the said pilot frequency and whose outgoing end is connected with two band-passing filters, two frequency changers connected on the one hand to one of the said filters and on the other hand to a stabilized heterodyne, the two last mentioned heterodynes producing frequencies equal to those used for the transposition of the original emission bands, two band-passing filters connected respectively with the said last mentioned frequency changers and feeding in parallel into a utilization line traversed by a wave containing frequencies of the initial modulation spectrum.

RAYMOND VILLEM.

REFERENCES CITED

The following references are of record in the file of this patent:

UNITED STATES PATENTS

| Number | Name | Date |
|---|---|---|
| 1,641,431 | Horton | Sept. 6, 1927 |
| 1,722,047 | Heising | July 23, 1929 |
| 1,882,653 | Sedlmayer | Oct. 11, 1932 |
| 2,017,886 | Barden et al. | Oct. 22, 1935 |
| 2,026,613 | Chireif et al. | Jan. 7, 1936 |
| 2,186,252 | Little | Jan. 9, 1940 |
| 2,291,978 | Mourdian | Aug. 4, 1942 |
| 2,302,352 | Goddard | Nov. 24, 1942 |
| 2,389,356 | Goldstine | Nov. 20, 1945 |
| 2,407,260 | Dickieson | Sept. 10, 1946 |
| 2,408,692 | Shore | Oct. 1, 1946 |
| 2,455,959 | Mark et al. | Dec. 14, 1948 |

FOREIGN PATENTS

| Number | Country | Date |
|---|---|---|
| 480,847 | Great Britain | Mar. 1, 1938 |